United States Patent Office 3,337,575
Patented Aug. 22, 1967

3,337,575
CERTAIN CARBAMOYL DIAZOLONES
Roger Boesch, Vitry-sur-Seine, and Jean Metivier, Paris, France, assignors to Rhone-Poulenc S.A., Paris, France, a French body corporate
No Drawing. Filed July 26, 1965, Ser. No. 474,962
Claims priority, application France, July 28, 1964, 983,351
7 Claims. (Cl. 260—307)

This invention relates to new diazole compounds, to processes for their preparation and compositions containing them.

According to the present invention, there are provided the new diazole compounds of the general formula:

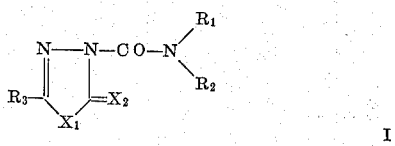

I in which $R_1$ and $R_2$ are the same or different and each represents a hydrogen atom or an alkyl group, $R_3$ represents a hydrogen atom, or an alkyl group, a phenyl group which may carry a halogen atom, or an alkyl, alkoxy or hydroxyl substituent, an aralkyl group containing 7 to 12 carbon atoms (preferably benzyl), a cycloalkyl group containing 3 to 6 carbon atoms, a five- or six-membered heterocyclyl group with one or more hetero atoms selected from oxygen, sulphur and nitrogen (e.g. furyl), or a cyano, alkoxy, alkylthio, alkoxycarbonyl, alkylcarbamoyl or alkanesulphonyl group, and $X_1$ and $X_2$ are the same or different and each represents an oxygen or sulphur atom. It is to be understood that in this specification and accompanying claims the alkyl, alkoxy and alkane groups referred to contain at most four carbon atoms.

According to a feature of the present invention, the diazole compounds of Formula I are prepared by the process which comprises reacting a carbamoyl halide of the general formula:

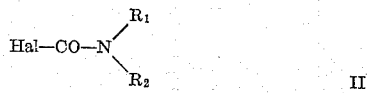

II in which Hal represents a halogen atom and $R_1$ and $R_2$ are as hereinbefore defined, with a diazole of the general formula:

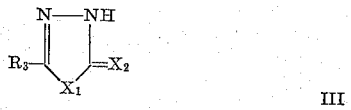

III in which $R_3$, $X_1$ and $X_2$ are as hereinbefore defined, or an alkali metal derivative thereof.

The reaction is preferably carried out in an inert organic solvent such as an aromatic hydrocarbon (e.g. benzene or toluene), a halogenated hydrocarbon (e.g. chloroform or chlorobenzene) or an aliphatic ketone (e.g. acetone) at a temperature between ambient temperature, i.e. 10°–30° C., and the boiling temperature of the reaction mixture, in the presence or absence of a condensing agent. When the reaction is effected in the presence of a condensing agent, it is preferably a tertiary organic base such as pyridine or triethylamine.

The starting materials of Formula III may be prepared by the action of a compound of the formula $CX_2Cl_2$ on a hydrazine of the formula $R_3$—$CX_1$—$NHNH_2$, in which $R_3$, $X_1$ and $X_2$ are as hereinbefore defined. The reaction is preferably effected in water.

According to a further feature of the invention, those diazole of Formula I, in which $R_1$ represents a hydrogen atom and $R_2$ is as hereinbefore defined, are prepared by reacting an isocyanate of the formula $R_2$—NCO, in which $R_2$ is as hereinbefore defined, with a compound of Formula III. When $R_2$ represents alkyl, the reaction is preferably effected in an inert organic solvent such as an aromatic hydrocarbon (e.g. benzene or toluene) at a temperature between ambient temperature and the reflux temperature of the reaction mixture. It is advantageous to employ a tertiary organic base, for example triethylamine, as condensing agent. When $R_2$ in the reactant $R_2$—NCO represents a hydrogen atom, the reaction is preferably carried out at ambient temperature in aqueous solution using an acid addition salt of the diazole starting material of the Formula III.

The new diazoles of general Formula I possess remarkable insecticidal properties, more especially in respect of aphids and caterpillars; they are particularly active as systemic insecticides. Preferred compounds are those in which $R_3$ represents a hydrogen atom or an alkyl, phenyl, cycloalkyl, alkoxy, furyl, alkoxycarbonyl or alkylcarbamoyl group. The most active compounds are those 1,3,4-oxadiazol-2-ones conforming to the formula:

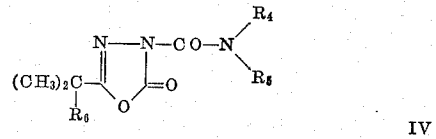

IV in which $R_4$ represents a hydrogen atom or a methyl or ethyl group, $R_5$ represents a methyl or ethyl group, and $R_6$ represents a hydrogen atom or a methyl group. Compounds of outstanding importance are 3-methylcarbamoyl-5 - tert. - butyl - 1,3,4 - oxadiazol - 2 - one, 3 - methylethylcarbamoyl-5-tert.-butyl-1,3,4-oxadiazol-2-one, 3-dimethylcarbamoyl-5-tert.-butyl-1,3,4-oxadiazol-2-one, 3-ethylcarbamoyl-5-tert.-butyl-1,3,4-oxadiazol-2-one and 3-methylcarbamoyl - 5 - isopropyl - 1,3,4 - oxadiazol - 2 - one, especially the three first-mentioned compounds.

The following examples illustrate the preparation of the new compounds of the invention.

*Example I*

To a solution of 5-propyl-1,3,4-oxadiazol-2-one (7.7 g.) in anhydrous benzene (45 cc.) there is added anhydrous triethylamine (3 drops) and then, drop-wise, a solution of methylisocyanate (3.4 g.) in anhydrous benzene (15 cc.). The temperature rises to 34° C. The reaction mixture is then heated for 2 hours under reflux and the benzene is thereafter driven off by distillation under reduced pressure. There is thus obtained 3-methylcarbamoyl-5-propyl-1,3,4-oxadiol-2-one (11.1 g.) which, after recrystallisation from a mixture of benzene and cyclohexane, melts at 76° C.

The initial 5-propyl-1,3,4-oxadiazol-2-one (B.P. 105–107° C./0.1 mm. Hg) is prepared by the action of phosgene on butyrylhydrazine, according to A. Dornow and K. Bruncken, Berichte, 82, 121 (1949).

*Example II*

To a solution of 5-tert.-butyl-1,3,4-oxadiazol-2-thione (15.8 g.) in anhydrous benzene (60 cc.) there is added anhydrous triethylamine (3 drops) and then a solution of methylisocyanate (5.7 g.) in anhydrous benzene (40 cc.); the temperature rises to 25° C. The reaction mixture is thereafter stirred for 3 hours at ambient temperature and then left standing overnight. The benzene solution is concentrated under reduced pressure, and a yellow oil is obtained as residue. After crystallisation of the oil there is obtained 3 - methylcarbamoyl - 5 - tert. - butyl - 1,3,4-oxadiazol-2-thione (12 g.) which, after recrystallisation from diisopropyl ether, melts at 66° C.

The initial 5-tert.-butyl-1,3,4-oxadazol-2-thione (M.P. 83° C.) is prepared either by the action of thiophosgene on trimethylacetylhydrazine or by the cyclisation of potassium trimethylacetyldithiocarbazinate in ethanol under reflux.

*Example III*

To a solution of 5-tert.-butyl-1,3,4-oxadiazol-2-thione (15.8 g.) and triethylamine (11.1 g.) in anhydrous benzene (60 cc.) there is added a solution of dimethylcarbamoyl chloride (10.7 g.) in anhydrous benzene (40 cc.). The reaction mixture is then stirred for 6 hours at ambient temperature. The triethylamine hydrochloride which is formed is separated by filtration and the benzene solution washed with water (100 cc.). After drying and removing the benzene by distillation under reduced pressure, there is obtained 3-dimethylcarbamoyl-5-tert.-butyl-1,3,4-oxadiazol-2-thione (18 g.) which, after recrystallisation from diisopropyl ether, melts at 76° C.

*Example IV*

Methylethylcarbamoyl chloride (12.1 g.) is added with stirring over a period of 5 minutes to a suspension of the potassium salt of 5-tert.-butyl-1,3,4-oxadiazol-2-one (18 g.) in anhydrous acetone (150 cc.) and then the reaction mixture is heated under reflux for 2 hours. After cooling and filtering, the solvent is distilled off under reduced pressure to give 3-methylethylcarbamoyl-5-tert.-butyl-1,3,4-oxadiazol-2-one (22 g.) which, after recrystallization from diisopropyl ether, melts at 65° C.

The oxadiazolone potassium salt used as starting material is obtained by the action of potassium ethoxide on 5-tert.-butyl-1,3,4-oxadiazol-2-one (B.P. 100–101° C./0.2 mm. Hg) itself prepared by the cyclisation of trimethylacetylurea with potassium hypobromite in an alkaline medium.

*Example V*

To a solution of 5-ethyl-1,3,4-oxadiazol-2-one (6.85 g.) in anhydrous benzene (45 cc.) containing anhydrous triethylamine (3 drops) there is added over a period of 10 minutes and with stirring a solution of methylisocyanate (3.42 g.) in anhyrous benzene (15 cc.). The temperature rises from 21° C. to 32° C. The reaction mixture is then heated under reflux for 2 hours and thereafter the solvent is distilled off under reduced pressure. The crystalline residue (10.5 g.) is recrystallised from carbon tetrachloride to give 3-methylcarbamoyl-5-ethyl-1,3,4-oxadiazol-2-one (9.5 g.), M.P. 70° C.

The 5-ethyl-1,3,4-oxadiazol-2-one (B.P. 111.5°–113° C./0.1 mm. Hg) employed as starting material is prepared by the cyclisation with phosgene of propionylhydrazine.

By proceeding as described in Examples I to V there are also obtained the products identified in the following table.

TABLE

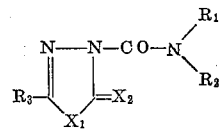

TABLE

| $-R_1$ | $-R_2$ | $-R_3$ | $-X_1-$ | $=X_2$ | Melting point |
|---|---|---|---|---|---|
| H | $-CH_3$ | $-CH_3$ | $-O-$ | $=O$ | 135°. |
| H | $-C_2H_5$ | $-CH_3$ | $-O-$ | $=O$ | 76°. |
| H | $-CH_3$ | $-CH(CH_3)_2$ | $-O-$ | $=O$ | 50–51°. |
| H | $-C_2H_5$ | $-CH(CH_3)_2$ | $-O-$ | $=O$ | 62°. |
| H | $-CH_3$ | $-C_4H_9$ | $-O-$ | $=O$ | 50°. |
| H | $-C_2H_5$ | $-C_4H_9$ | $-O-$ | $=O$ | 32.2–32.4°. |
| H | $-CH_3$ | $-C(CH_3)_3$ | $-O-$ | $=O$ | 95–97°. |
| H | $-C_2H_5$ | $-C(CH_3)_3$ | $-S-$ | $=S$ | 54–56°. |
| H | $-CH_3$ | $-OCH_3$ | $-S-$ | $=O$ | 131–135°. |
| H | $-CH_3$ | ⬡ | $-O-$ | $=O$ | 183°. |
| H | $-C_2H_5$ | furyl | $-O-$ | $=O$ | 133–134°. |
| H | $-CH_3$ | $-CONHCH_3$ | $-O-$ | $=O$ | 248°. |
| H | $-C_2H_5$ | $-COOC_2H_5$ | $-O-$ | $=O$ | 96°. |
| H | $-C_2H_5$ | $-C(CH_3)_3$ | $-O-$ | $=O$ | 41.6–42.2°. |
| H | $-C_2H_5$ | $-C(CH_3)_3$ | $-S-$ | $=O$ | 102°. |
| $-CH_3$ | $-CH_3$ | $-C(CH_3)_3$ | $-O-$ | $=O$ | 92°. |
| $-CH_3$ | $-CH_3$ | $-CH_3$ | $-O-$ | $=O$ | 70–72°. |
| $-C_2H_5$ | $-CH_3$ | $-C(CH_3)_3$ | $-O-$ | $=O$ | 77–78°. |
| H | $-CH_3$ | H | $-O-$ | $=O$ | 158–159°. |
| $-C_3H_7$ | $-C_3H_7$ | $-C(CH_3)_3$ | $-O-$ | $=O$ | B.P. 125°/0.05 mm. Hg. |
| $-CH_3$ | $-C_2H_5$ | $-C_3H_5$ cyclo | $-O-$ | $=O$ | B.P. 135–136°/0.1 mm. Hg. |
| H | $-CH_3$ | $-C_3H_5$ cyclo | $-O-$ | $=O$ | 109.5°. |
| $-CH_3$ | $-CH_3$ | $-C_3H_5$ cyclo | $-O-$ | $=O$ | 73–74°. |
| H | $-C(CH_3)_3$ | $-C(CH_3)_3$ | $-O-$ | $=O$ | 58–59°. |
| H | $-CH(CH_3)_2$ | $-C(CH_3)_3$ | $-O-$ | $=O$ | B.P. 96–98°/0.1 mm. Hg. |
| H | $-CH(CH_3)_2$ | $-C_4H_9$ | $-O-$ | $=O$ | B.P. 116–119°/0.1 mm. Hg. |

According to a further feature of the present invention, there are provided insecticidal compositions containing at least one diazole compound of Formula I in association with one or more diluents compatible with the diazole and suitable for use in agricultural insecticidal compositions. Preferably the compositions contain before 0.005 and 90% by weight of diazole. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the diazole is dissolved or dispersed. The compositions may thus take the form of suspensions, emulsions or solutions in organic or aqueous-organic media, for example aromatic hydrocarbons such as toluene or xylene, acetophenone, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anyhdrosorbitols which have been rendered soluble by etherification of the free hydroxyl groups by condensation with ethylene oxide. It is preferable to use agents of the non-ionic type because they are not sensitive to electrolytes. When desired, the emulsions of the diazoles may be in the form of self-emulsifying concentrates containing the active substance dissolved in the emulsifying agent or in a solvent containing an emulsifying agent compatible with the solvent, a simple addition of water to such concentrates producing compositions ready for use.

The solid compositions are preferably prepared by grinding the diazole with the solid diluent or by impregnating the solid diluent with a solution of the diazole in a volatile solvent, evaporating the solvent, and if necessary grinding the product so as to obtain a powder, and may optionally incorporate a wetting or dispersing agent, for example of the types hereinbefore described.

The product of Formula I are preferably employed for insecticidal purposes in a quantity of 20 to 80 grams of active substance per hectolitre of water, but concentrations of less than 20 grams per hectolitre of water can equally be used.

The following examples illustrate insecticidal compositions according to the invention.

*Example VI*

To 3-methylcarbamoyl-5-tert.-butyl-1,3,4-oxadiazol-2-one (25 q.) is added a wetting agent (5 g.) obtained by condensation of octylphenol (1 mole) and ethylene oxide (10 moles), and sufficient acetophenone to make the volume up to 100 cc.

The solution thus obtained is used, after suitable dilution with water, for destroying aphids and red spiders. Depending on the effect which is desired, concentrations of 5 to 50 g. of oxadiazolone per hectolitre of solution are necessary for obtaining good results.

*Example VII*

To 3-methylethylcarbamoyl-5-tert.-butyl-1,3,4-oxadiazol-2-one (500 g.) there are added sodium dioctylsulphosuccinate (50 g.), a condensation product (50 g.) obtained by reaction of ethylene oxide (4 moles) with oleic acid (1 mole), and sufficient acetophenone to make the volume up to 100 cc.

The solution thus obtained is used, after suitable dilution with water, for destroying aphids and caterpillars. An adequate concentration of the oxadiazolone is obtained by adding water to 100 cc. of the solution prepared as described above until a volume of 100 litres is reached.

We claim:
1. Diazole compounds of the formula:

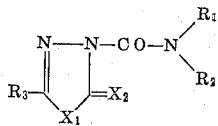

wherein $R_1$ and $R_2$ each represent hydrogen or alkyl, $R_3$ represents hydrogen, or an alkyl, phenyl, cycloalkyl having 3 through 6 carbon atoms, alkoxy, furyl, alkoxycarbonyl or alkylcarbamoyl group, the said alkyl and alkoxy groups having at most four carbons atoms, and $X_1$ and $X_2$ each represent oxygen or sulphur.

2. Diazole compounds of the formula:

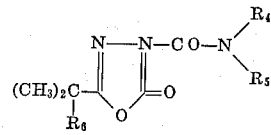

wherein $R_4$ represents hydrogen, methyl or ethyl, $R_5$ represents methyl or ethyl, and $R_6$ represents hydrogen or methyl.

3. 3-methylcarbamoyl-5-tert.-butyl-1,3,4,-oxadiazol-2-one.

4. 3-methylethylcarbamoyl-5-tert.-butyl-1,3,4-oxadiazol-2-one.

5. 3-dimethylcarbamoyl-5-tert.-butyl-1,3,4-oxadiazol-2-one.

6. 3-ethylcarbamoyl-5-tert.-butyl-1,3,4-oxadiazol-2-one.

7. 3-methylcarbamoyl-5-isopropyl-1,3,4-oxadiazol-2-one.

References Cited

UNITED STATES PATENTS

| | | | |
|---|---|---|---|
| 2,285,410 | 6/1942 | Bousquet | 167—33 |
| 2,349,344 | 5/1944 | Gertler | 167—33 |
| 2,762,695 | 9/1956 | Gerjovich et al. | 260—553 |
| 2,852,523 | 9/1958 | Lopresti | 260—307 |
| 3,129,246 | 4/1964 | Harris et al. | 260—553 |
| 3,202,673 | 8/1965 | Metivier | 260—307 |

ALEX MAZEL, *Primary Examiner.*

JULIAN S. LEVITT, *Examiner.*

RICHARD J. GALLAGHER, STANLEY J. FRIEDMAN, *Assistant Examiners.*